Feb. 11, 1969 P. B. CLARK 3,427,447
LUMINAIRE OPTICAL ASSEMBLY
Filed Nov. 14, 1966
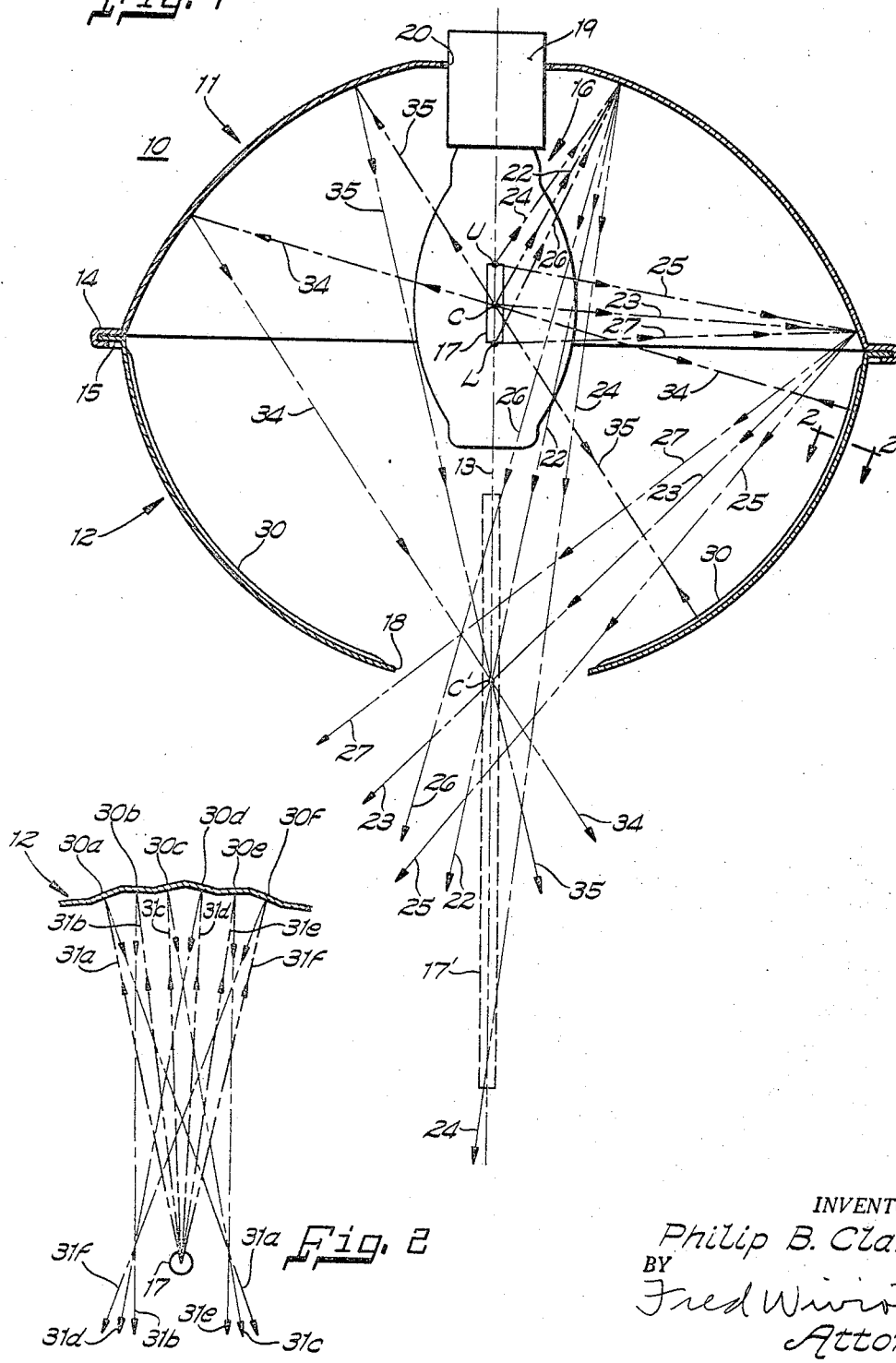
INVENTOR.
Philip B. Clark
BY
Fred Wiviott
Attorney

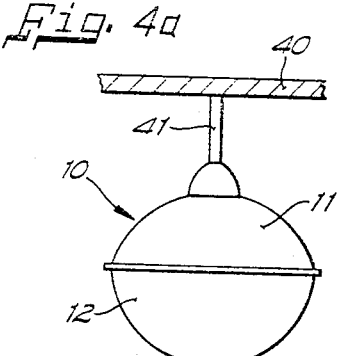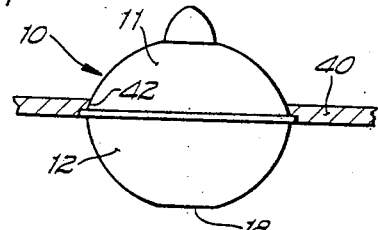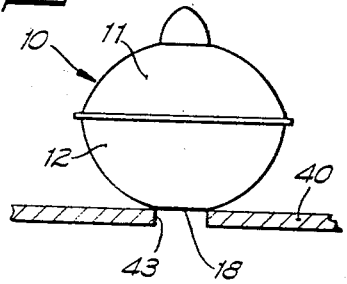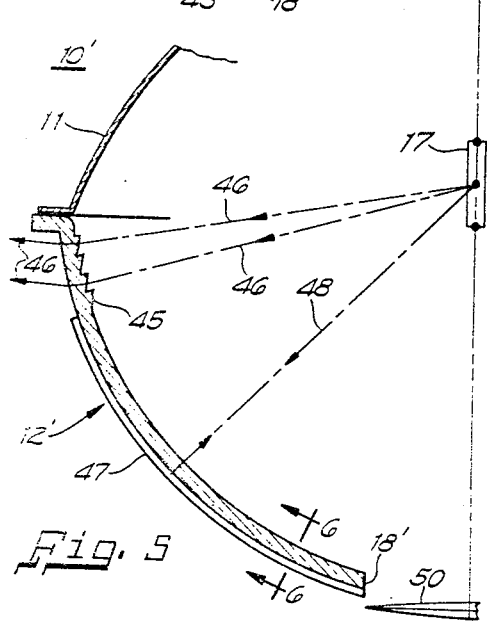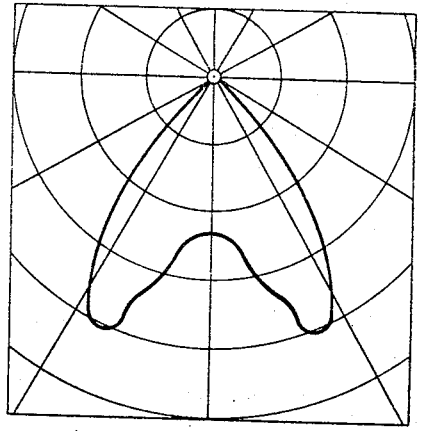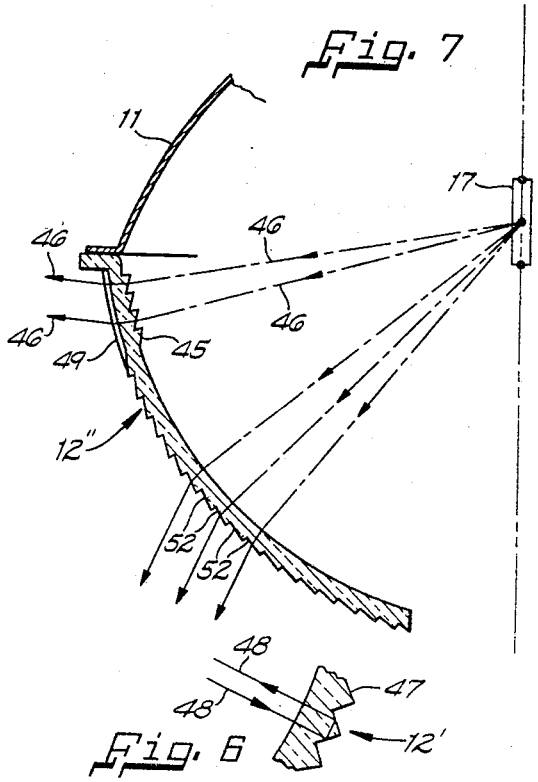
INVENTOR.
Philip B. Clark United States Patent Office
3,427,44
Patented Feb. 11, 196

3,427,447
LUMINAIRE OPTICAL ASSEMBLY
Philip B. Clark, Hales Corner, Wis., assignor to McGraw-Edison Company, Milwaukee, Wis., a corporation of Delaware
Filed Nov. 14, 1966, Ser. No. 593,830
U.S. Cl. 240—93     2 Claims
Int. Cl. F21v *13/04*

ABSTRACT OF THE DISCLOSURE

A luminaire having opposed first and second generally curvilinear light modifying elements surrounding a light source. The second light modifying element includes a central aperture formed generally along the axis of symmetry of the luminaire. The first light modifying element and the second light modifying element are arranged to direct most of the light produced by the light source through the aperture. The second light modifying element further includes refracting prismatic elements.

---

This invention relates to luminaire optical assemblies and, more particularly, to an optical assembly having particular but not exclusive application to indoor use.

It is an object of the invention to provide a new and improved luminaire optical assembly.

Another object of the invention is to provide a luminaire optical assembly having particular but not exclusive application for indoor lighting purposes wherein a discharge type lamp is employed.

A still further object of the invention is to provide a luminaire optical assembly which provides a highly concentrated controlled light pattern from a concealed light source.

These and other objects and advantages of the instant invention will become more apparent from the detailed description thereof taken with the accompanying drawings, in which:

FIG. 1 is a side elevational view, partly in section, of a luminaire optical assembly constructed in accordance with a preferred embodiment of the instant invention;

FIG. 2 is a view taken along line 2—2 of FIG. 1;

FIG. 3 is a photometric diagram illustrating the light distribution of the optical assembly shown in FIG. 1;

FIGS. 4a, 4b and 4c illustrate the application of the luminaire illustrated in FIG. 1;

FIG. 5 is a fragmentary view illustrating an alternate embodiment of the instant invention;

FIG. 6 is a view taken along lines 6—6 of FIG. 5; and

FIG. 7 is a fragmentary view illustrating yet another embodiment of the invention.

In general terms the invention comprises a luminaire having opposed first and second generally curvilinear light modifying means, means for supporting a light source within the first light modifying means and generally along the axis of symmetry thereof, a central aperture formed in the second light modifying means and generally along the axis of symmetry, the first light modifying means being constructed and arranged to reflect all substantially incident light rays generally backwardly toward the axis and through the opening to the opposite side of the luminaire, substantially all of the incdient light on the second light modifying means being modified in a manner which supplements the light from the first light modifying means.

Referring now to the drawings in greater detail, and more particularly to FIG. 1, the optical assembly 10 is shown to include an inverted generally curvilinear upper reflector 11 and a generally curvilinear lower reflector 12, each of which is generally symmetrical about a vertical axis 13. The upper reflector 11 has a generally circular lower rim 14 which cooperatively engages the upper r 15 of the lower reflector 12. In adidtion a generally cir lar aperture 18 is formed in the lower reflector 12. T aperture 18 is generally symmetrical relative to the axis and is substantially smaller than the upper rim of : flector 12.

A lampholder 19 extends through a central apertu 20 in the reflector 11 for supporting a lamp 16 within t optical assembly 10 and generally along the vertical a: 13. In the illustrated embodiment of the invention, t lamp 16 is shown to be of the discharged type having elongate light source 17 which is disposed along the v( tical axis 13 and above the lower rim of the reflector 1

In the preferred embodiment of the invention, the 1 flector 11 is generally ellipsoidal in vertical cross sectic In addition, the reflector 12 is generally spheroidal in v( tical cross section.

The ellipsoidal reflector 11 reflects all incident light ra from any given point on the source 17 into a focal po: located along the vertical axis 13. For example, repi sentative rays 22 or 23 from the center C of the sour 17 will be reflected downwardly to a focal point C′ l cated at approximately the center of the aperture 18. addition, all light rays from any given point in the sour 17 which is above the point C will be reflected backwarc and below the focal point C′ and all light rays from a given point in the source 17 which is below the point will be reflected backwardly and above the focal point Thus, the rays 24 and 25 from a point U in the upp end of the source 17 will be reflected into an area belc the focal point C′ and the rays 26 and 27 from a point at the lower end of the source 17 will be reflected ir an area below the focal point C′. It can be seen that the areas lie along the axis 13 and on the opposite sides the opening 18. As a result, an image 17′ of the source is created at the opening 18. The length of the ima 17 and its position relative to the opening 18 can modified by varying the shape of the reflector 11.

The center of curvature of the spheroidal lower refle tor 12 is at the center C of the light source 17 so that : incident rays from point C will be directed backwarc toward the source 17. In order to prevent these rays fro passing through the source 17, the reflector 14 may provided with a plurality of equally spaced vertical flut 30 extending from its upper to its lower end. As seen FIGS. 1 and 2, the flutes 30 consist in vertical cross se tion of intersecting arcs which retain the same curvatu throughout their lengths and for this reason become n; rower and shallower as they progress from top to botto The centers of curvature of the flutes 30 are arrang so that adjacent pairs of flutes are canted toward the c posite sides of the source 17. As a result, all light ra 31*a*, 31*b* and 31*c* incident on the flutes 30*a*, 30*b* and 3 would be reflected to points lying generally on the rig side of the source 17 as viewed in FIG. 2 and rays 31 31*e* and 31*f* on the flutes 30*d*, 30*e* and 30*f* will be 1 flected to points lying generally on the left side of sa source.

Referring again to FIG. 1, it can be seen that light ra 34 and 35 from the center of the source C, and incide on the reflector 14, will be reflected backwardly onto t reflector 11 whereby they will be further reflected dow wardly and substantially through the focal point C′.

It can thus be seen that the luminaire 10 according the instant invention provides a cone of light below t luminaire with substantially little stray light at angl higher than approximately 45° from the nadir as seen the photometric diagram in FIG. 3. In this manner, t light source 17 of the lamp 16 is substantially hidden the reflectors 11 and 12 to substantially eliminate : sidewise glare without any substantial loss in illuminatic While the size of the opening 18 is not critical, it preferably large enough to permit the passage of substantially all of the light reflected from reflector 11 and yet small enough to substantially shield the lamp 16.

FIGS. 4a, 4b and 4c illustrate how the mounting of the luminaire 10 may be varied relative to a ceiling structure 40. For example, in FIG. 4a the luminaire 10 is mounted below the wall 40 by means of a support member 41. In FIG. 4b the luminaire 40 is mounted in an aperture 42 formed in the ceiling 40 so that only the lower reflector 12 extends below the level thereof. Lastly, in FIG. 4c the luminaire 10 is mounted completely above the ceiling 40 with the aperture 18 in the luminaire 10 being in registry with an aperture 43 formed in said ceiling.

FIG. 5 shows an alternate embodiment of the invention wherein the lower portion of the optical assembly 10' comprises a prismatic member 12'. A plurality of annular refracting prisms 45 are formed on the inner surface of the member 12' and adjacent the upper end thereof. These refracting prisms 45 are constructed and arranged to bend light rays 46 emanating from the source 17 in a generally upward direction. In this manner, when the luminaire 10' is mounted in the manner shown in FIG. 4a or 4b, the ceiling area around the luminaire will be illuminated.

In addition the member 12' of FIG. 5 may be provided with longitudinally extending totally reflecting prisms 47 formed on its outer surface and which reflect light rays 48 from the light source 17 backwardly past said light source and onto the reflector 11 in a similar manner as the flutes 30 of the reflector 12 shown in FIG. 1.

FIG. 5 also illustrates that the luminaire 10 may be provided with a further light modifying means 50 adjacent the opening 18' in the optical member 12'. While the means 50 is shown to be a lens, those skilled in the art will appreciate that it may comprise any type of light refracting means.

FIG. 7 illustrates yet another embodiment of the instant invention wherein the optical member 12" is provided with annular refracting prisms 52 which refract and direct light rays from the source 17 downwardly and at angles which complement the reflected rays from the reflector 11. Another modification shown in FIG. 7 are vertical refracting prisms 49 formed on the outer surface of the optical member 12" for defusing the upwardly directed rays 46.

While only a few embodiments of the instant invention have been illustrated and described, others will become apparent to those skilled in the art once applicant's invention is known. Accordingly, it is not intended to limit the invention to the illustrated embodiments but only by the scope of the appending claims.

I claim:
1. A luminaire having an axis and comprising opposed first and second generally curvilinear light modifying means, means for supporting a light source within said first light modifying means and generally along said axis, a central aperture formed in said second light modifying means and generally along said axis, said first light modifying means being constructed and arranged to reflect substantially all incident light rays backwardly toward said axis and through said opening to the opposite side of said luminaire, substantially all the light rays from said source incident on said second light modifying means being modified in a manner to supplement the light from said first light modifying means, said second light modifying means comprising a refractor having a first plurality of refracting prisms disposed adjacent its peripheral rim for refracting incident light generally in the direction of said first light modifying means, said refractor also having reflecting prisms formed thereon for reflecting light backwardly towards said axis and onto said first light modifying means at the opposite side of said axis for redirection through said opening.

2. A luminaire having an axis and comprising opposed first and second generally curvilinear light modifying means, means for supporting a light source within said first light modifying means and generally along said axis, a central aperture formed in said second light modifying means and generally along said axis, said first light modifying means being constructed and arranged to reflect substantially all incident light rays backwardly toward said axis and through said opening to the opposite side of said luminaire, substantially all the light rays from said source incident on said second light modifying means being modified in a manner to supplement the light from said first light modifying means, said second light modifying means comprising a refractor having a first plurality of refracting prisms disposed adjacent its peripheral rim for refracting incident light generally in the direction of said first light modifying means, said refractor also having refracting prisms thereon for redirecting light in a supplementary relation to that passing through said aperture.

References Cited

UNITED STATES PATENTS

| 2,147,679 | 2/1939 | Stanton et al. | 240—41.1 XR |
| 2,493,087 | 1/1950 | Rolph | 240—93 XR |
| 2,773,172 | 12/1956 | Pennow | 240—106 XR |
| 3,062,953 | 11/1962 | Clark et al. | 240—25 |

NORTON ANSHER, *Primary Examiner.*

R. M. SHEER, *Assistant Examiner.*

U.S. Cl. X.R.

240—41.37, 106